Dec. 20, 1966     S. J. POPEIL     3,292,257
CULINARY DEVICE FOR SHELLING CORN, CORING AND SUCH
Filed July 24, 1964     4 Sheets-Sheet 1
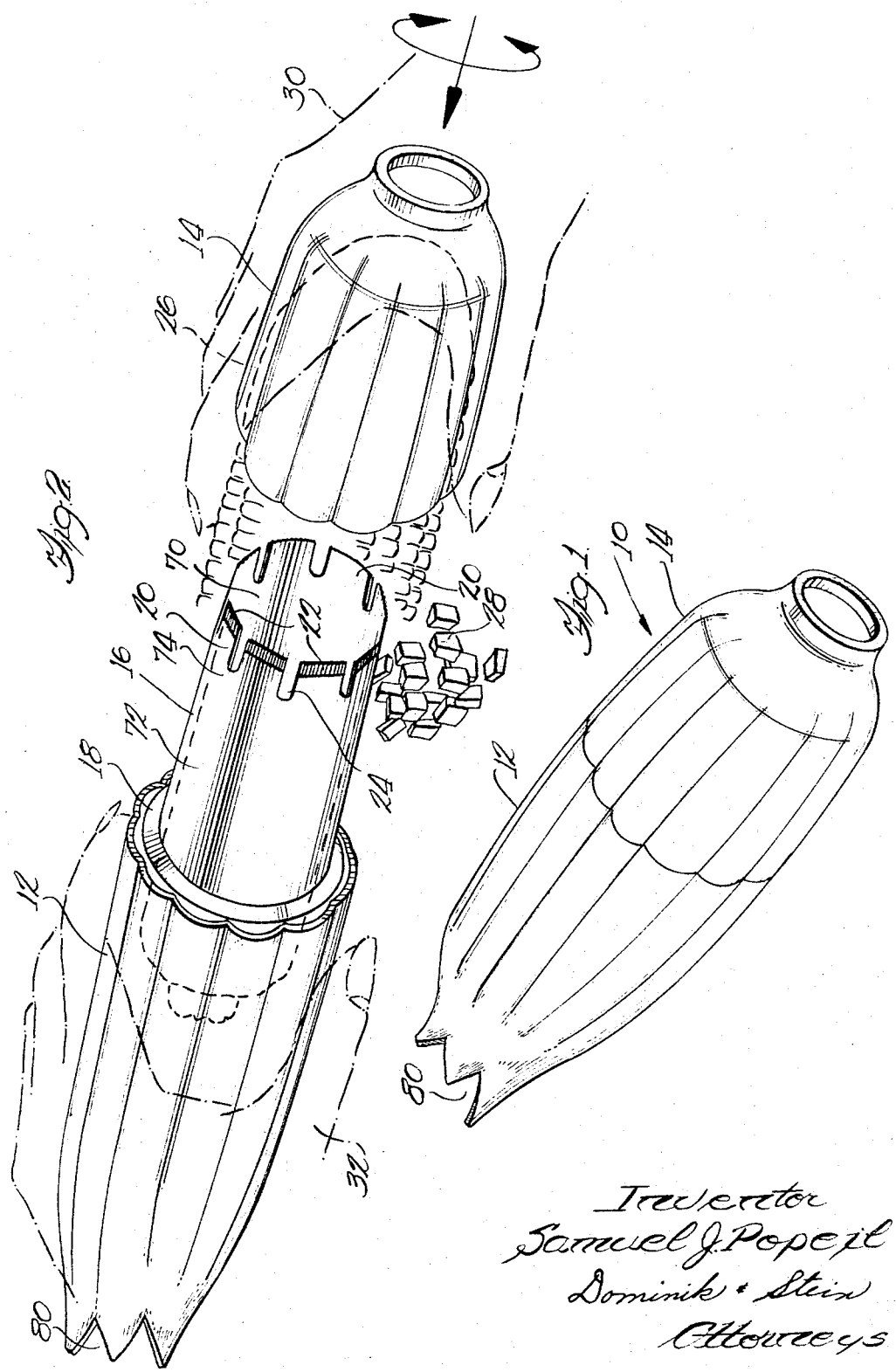

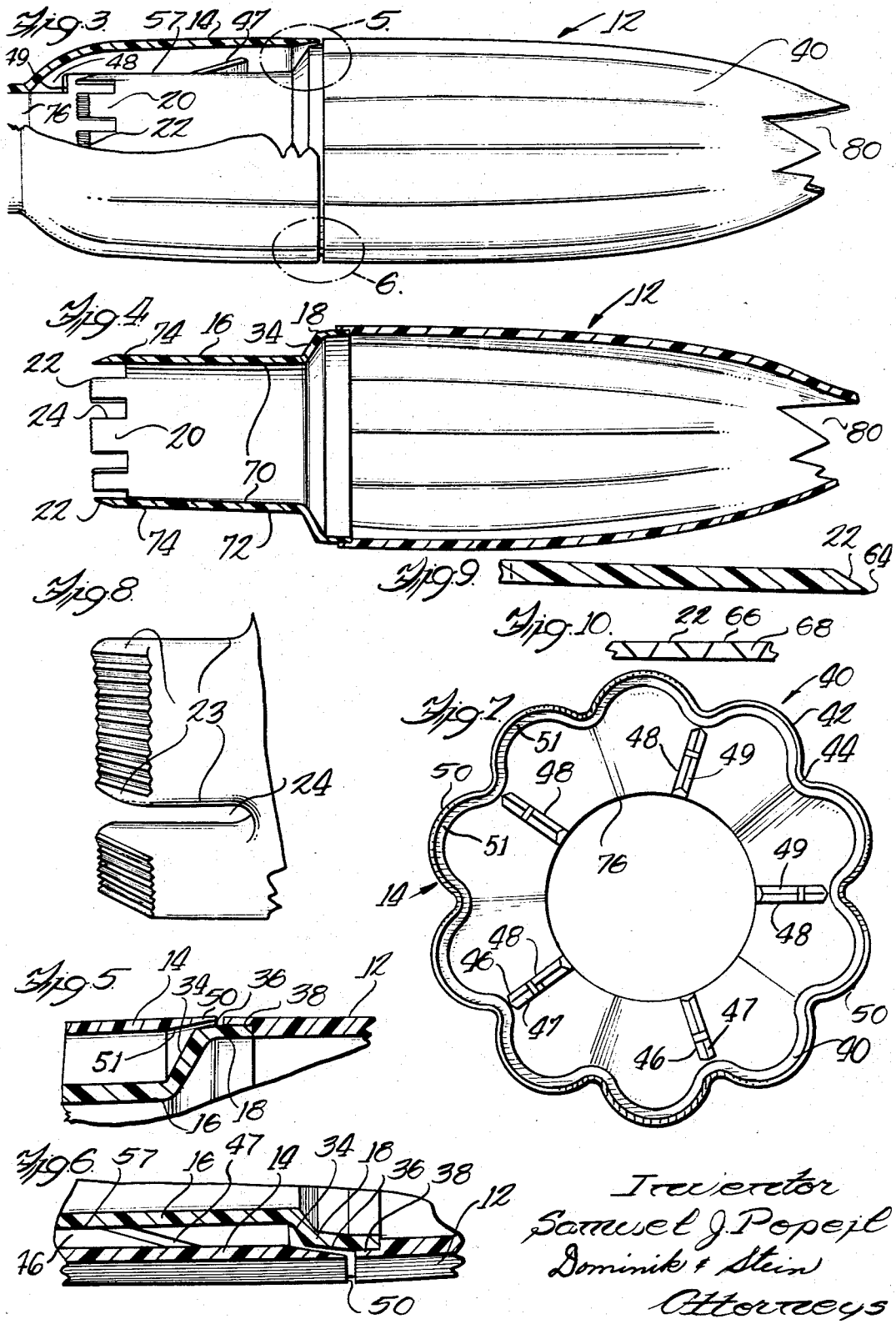

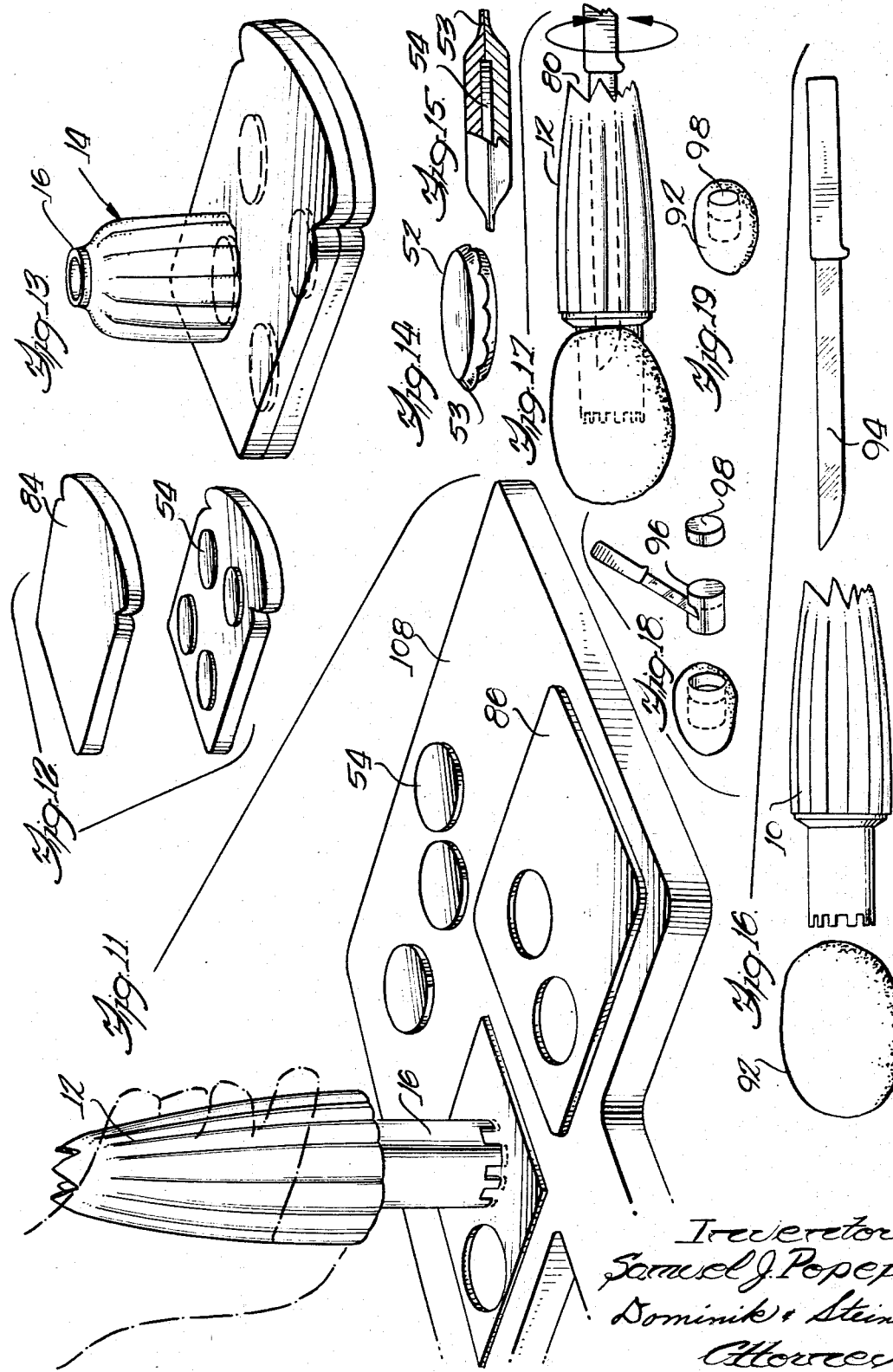

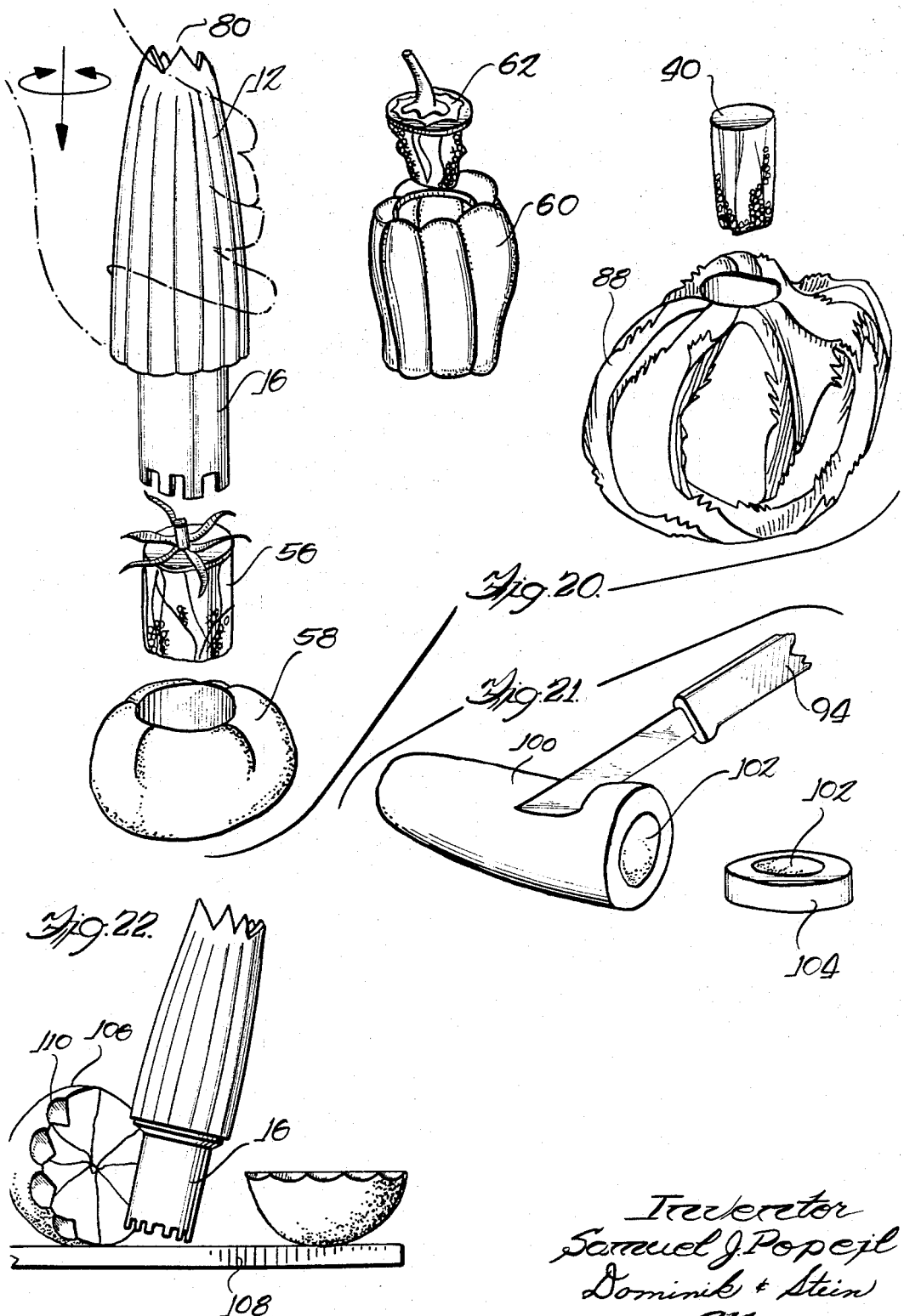

United States Patent Office 3,292,257
Patented Dec. 20, 1966

3,292,257
CULINARY DEVICE FOR SHELLING CORN, CORING AND SUCH
Samuel J. Popeil, 2920 N. Commonwealth, Chicago, Ill. 60657
Filed July 24, 1964, Ser. No. 384,920
9 Claims. (Cl. 30—301)

The present invention relates to a culinary device for coring, cutting, and stripping a wide variety of foods. More particularly the invention relates to a culinary device which can be utilized by the householder in the kitchen for stripping corn off the ear, cutting cookies and canapes, a pastry cutter, and also for coring many different fruits and vegetables.

Today's homemaker is forever plagued with numerous devices to be kept in her kitchen, each of which serves but a single purpose. For example, a paring knife is kept which may, in combination with a cutting board, be used to strip corn off of the cooked ear, or an uncooked ear. For cutting pastry a separate cookie cutter or pastry cutter is employed. In addition, for coring of various fruits and vegetables she may require one or more coring devices, or a different paring knife is employed.

It is a primary object of the present invention to combine into one structure a culinary device which is capable of stripping corn, making cookies and canapes, as well as coring fruit and vegetables, such as apples, tomatoes, green peppers, grapefruit, pineapple, cucumbers, lettuce and potatoes.

A related object of the invention is to provide a coring, cutting, and stripping appliance which is also adaptable for making petite sandwiches in which two slices of bread are placed each over the other with either cheese or other filler in between, and the same portion of the device which is employed for stripping corn can be employed to make inserts for attractive petite sandwiches for toasting or other service as hors d'oeurves. The sandwich exterior is cut and decorated by the same element which also serves as a hot corn holder and a cover for the device when stored.

Still another object of the invention is to provide an appliance for stripping corn in which the handle guard portion also serves as a heat insulator so that piping hot ears of corn can have the kernels stripped therefrom without burning the hands, or requiring the use of kitchen mitts, hot pads, or the like. The handle guard also protects the hand from accidental cutting when the corn is stripped.

A further and more detailed object of the present invention is to provide an appliance which serves as a corn stripper in which the configuration and proportion of the corn stripping portion is such as to automatically guide the stripper over the corncob to insure uniformity in cutting the kernels. A related and more detailed feature of the invention looks to the provision of an appliance for stripping corn which severs the kernels gently from the cob thereby permitting them to all drop into a bowl, and not requiring special shields to prevent the corn scattering to undesired areas.

Yet another object of the invention looks to the provision of a culinary device fulfilling the foregoing objectives which can be readily formed from a few plastic or metal parts, durably assembled, and marketed to the homemaker at a cost which she can easily afford for a device which performs the multitude of functions for which this appliance is intended.

Further objects and advantages of the invention will become apparent as the following description of an illustrative embodiment proceeds, taken in conjunction with the accompanying drawings of one embodiment of the invention, in which:

FIG. 1 is a perspective view of the appliance illustrative of the invention with the cover in position.

FIG. 2 is a partially diagrammatic illustrative view of the subject appliance shown stripping kernels from an ear of corn.

FIG. 3 is a front elevation of the appliance as shown in FIG. 1, being partially broken and sectioned at the cover portion to illustrate the relationship between the cover and the main body of the device.

FIG. 4 is a longitudinal sectional view of the main body portion of the device as shown in FIG. 3, the cover having been removed.

FIG. 5 is an enlarged partially sectioned view taken at area 5 shown on FIG. 3 and illustrating the joint between the cover and the cutter collar and handle.

FIG. 6 is an enlarged partially transverse view taken at area 6 of FIG. 3 illustrating the joint between the cover and the handle and cutter portion and illustrating a further phase of the locking action.

FIG. 7 is a bottom view of the cover showing the scalloped edges and the interior structure for locking to the cutter and engaging the corn when the cover is used as a handle.

FIG. 8 is an enlarged partially perspective view illustrating the details of the cutter teeth as taken from the mold.

FIG. 9 is an enlarged longitudinal section taken through the tooth portion of the cutter.

FIG. 10 is a front elevation of the cutter teeth.

FIG. 11 is an enlarged partially diagrammatic view of a cutting board illustrating how the cutter is employed to cut inserts for making petite sandwiches.

FIG. 12 is a diagrammatic perspective view illustrating how the cut inserts as shown in FIG. 11 are positioned between two slices of bread.

FIG. 13 is a perspective view showing in phantom lines how the cover and its scalloped cutting edge are employed to cut a petite sandwich.

FIG. 14 is a perspective view of a petite sandwich cut in the manner shown in FIG. 13.

FIG. 15 is a transverse partially sectioned view of the petite sandwich shown in FIG. 14 showing the relationship between the bread and the food insert.

FIG. 16 is an exploded view illustrating how a potato can be cored for stuffing utilizing the coring device and a knife.

FIG. 17 illustrates diagrammatically how the core is cut from the potato, and the knife is employed to remove the core.

FIG. 18 shows the potato core after removal being cut to plug the stuffed area after stuffing is completed.

FIG. 19 shows the potato having been stuffed, and in phantom lines illustrating where the stuffing appears.

FIG. 20 is an enlarged diagrammatic view illustrating various corings which can be made by the coring portion of the device.

FIG. 21 illustrates another end usage of the culinary device in slicing cheese-stuffed cucumbers.

FIG 22 illustrates how the cutter can also be employed to scallop the edges of a grapefruit.

Referring now to the drawings, and more particularly FIGS. 1 and 2, it will be seen that the culinary device 10 comprises a handle 12 which mates with a cover 14, the handle portion terminating at its far end in a tubular cutter 16. In order to strip the kernals 28 from an ear of corn 26, as shown in FIG. 2, the right hand 30 grasps the cover 14 and slips it over one end of the ear of corn. At the same time the left hand 32 grasps the handle 12 and advances the handle and its associated tubular cutter 16 so that the tooth segments 20 and their integral teeth 22 are oscillated about the cob of the corn. The kernels are thereby readily stripped from the ear.

Structurally, the tubular cutter 16 is secured to the handle 12 by means of a collar 18. In this manner the entire appliance 10 may be assembled from three elements molded from plastic or formed of metal, none of which has a wall thickness in excess of .075". Necessarily with such a construction, the cost of the product can be held to an irreducible minimum, and yet with the surprising result of unusual durability and numerous useful applications in the preparation and decorating of foods.

The detailed construction of the appliance which renders manufacture so simple from plastic molding will be better appreciated by reference to FIGS. 3 through 10 inclusive. There it will be seen that the handle 12 comprises an elongate tubular body, the longitudinal cylindrical portion of which is proportioned to have a plurality of flutes 40, each flute comprising flute lands 42 and their adjacent flute grooves 44. The cover 14 is similarly and complementarily fluted (see FIG. 7). The fluted handle construction serves numerous purposes: First, it lends unusual strength to a thin wall section; second, it provides for cooling when the cover 14 is employed as illustrated in FIG. 2 to hold the end of a hot ear of corn; and, third, when working with foodstuffs the hands are often wet and the fluted tubular construction along with striations which are provided longitudinally of the flutes prevents the handle from slipping in the hand. Also, as a matter of decor (see FIGS. 1 and 2), the device 10 takes on the configuration, when colored green, of an ear of corn which suggests one of the many kitchen uses.

FIGS. 5 and 6 show an enlarged transverse section of the structural relationship between the cover 14, the handle 12, and the tubular cutter 16 and its associated collar 18. There it will be seen that the collar 18 is a flared-out extension of the tubular cutter portion 16, and presents a tapered collar face 34 terminating in a collar skirt 36. The collar skirt 36 has a complementary exterior face for being received within the collar mounting notch 38 at the interior portion of the forward end of the tubular handle 12. The collar skirt 36 is formed complementarily to the interior scalloped configuration of the handle 12 so that, in effect, the collar has its fluted face with lands and grooves to mate with the same configuration of the handle. This permits the elements to be glued together and locked securely against rotation. The compressive forces which are the principal forces when in use actually serve to reinforce the joint between the tubular cutter and the handle. The tapered inner face 51 provided on the interior face of the cover 14 serves the twofold purpose of providing for a mating action with the outer face of the collar skirt 36, and also presents a scalloped decorating cutting edge 50, the function of which will be set forth.

The additional details of the cover 14 are apparent in FIG. 7. There it will be seen that the cover tapers centrally to a finger hole 76, and that the alternating groove portions of the fluted surface have at their inner portion a lock 48 (see also FIG. 3). The locks 48 are provided to present forwardly extending tapered edges 49 which dig into the end of a corn husk (see FIG. 2) when the cover 14 is employed to hold one end of an ear of corn 26.

A finger-like guide 46, of which five are shown, extends forwardly toward the cutting edge 50 of the cover 14, but terminate at a guide taper 47. The taper 47 gently receives the ear of corn, whether the kernels are on or stripped, and permits the ear to be further inserted in the cover 14 until it is grasped by the lock 48. The finger-like guides serve to center the ear of corn when held in the cover 14, and additionally guide the ear of corn for stripping. The action of the finger-like guides 46 spaces the hot ear of corn uniformly from the fluted wall of the cover 14. This permits air circulation and cooling to prevent burning the hand while stripping a hot ear of corn. Also, as shown in FIGS. 3 and 5, the finger-like guides 46 are tapered with a long edge 57 to matingly engage the tubular cutter 16 when the cover is positioned for storage.

Before discussing the precise details of the taper and configuration of the tubular cutter 16 of a commercial embodiment, some of the factors involved in the problem of successfully employing a tubular cutter which will both strip corn and core a wide variety of fruits and vegetables need be understood. In stripping corn, as shown in FIG. 2, it is essential to have some interior taper converging toward the teeth 22 of the tubular cutter body 16 in order to prevent binding on the corn cob, and similarly on any core cut from a hard vegetable such as a potato. On the other hand, it is essential to minimize the taper to prevent splitting of hard fruits or vegetables such as an apple or potato when the tubular member 16 is employed as a core cutter. When the core is to be removed, a small amount of taper is desirable in order to retain the core within the tubular portion of the cutter 16 for removing the same. By minimizing the taper, however, the amount of effort required to core is reduced to the lowest amount commensurate with not splitting the fruit or vegetable, and yet retaining the core. Furthermore, a small degree of taper, coupled with the segmented tooth sections separated by the segment slots 24 permits a certain degree of flexibility for varying diameters of corn cobs.

It has been discovered that if the taper is less than one degree on the inside of the tubular cutter 16, corn begins to bind. On the other hand, if the taper exceeds one and one-half to three degrees on the outside, apples, potatoes, and cucumbers have a tendency to split when cored. Similarly if the interior taper exceeds three degrees, and the length of the tubular cutter 16 is equal to the diameter, or approximately the same, cocking and uneven peeling of the corn kernels 28 from the corn cob results. Thus the angularity of the taper both inside and outside has a critical limitation between one-half degree and three degrees. Similarly the length of the tubular cutter 16 bears a desirable ratio to the interior diameter. Desirably it should be within the range of one-to-one to two-to-one in order to provide sufficient guidance, and yet to not provide such a higher degree of internal sticking friction as to render both corn stripping and coring a task requiring more effort than that to which the user is normally accustomed.

Referring now to FIG. 4, the angular dimensions of a successful commercial device will be reviewed. In FIG. 4 it will be observed that there is a center taper portion 70 near the juncture between the tapered tubular member 16 and the collar face 34. The exterior taper is limited to ½°, and the interior taper to 1°, both tapering convergingly toward the tooth segments 20. The exterior end taper portion 74 is limited to 1° nearly adjacent the tooth portion, in contradistinction to the ½° base taper 72. The center taper 70, however, is held uniformly at 1°. Limiting the taper to these proportions still permits stripping corn, and yet will hold to an irreducible minimum any tendency for splitting an apple, potato, or cucumber when the same is cored. The interior diameter found best for that type of corn normally served as sweet corn is 1.188". The depth of the segment slots 24 is held to .375". In the same commercial embodiment, the ratio of the length of the tubular portion 16 to the junction with the collar 18 to the interior diameter approximates 1.5:1. This ratio is held desirably between the limits of 1:1 and 2:1. In the aforementioned commercial device, the distance from the ends of the teeth 22 to the base of the collar face 34 is 2". The wall thickness approximates 0.068" on the tubular portion.

The tooth construction is shown in greater detail in FIGS. 8 through 10 inclusive. There it will be seen that there are approximately ten teeth 22 provided in each of the tooth segments 20. The tooth segments 20 are separated by segment slots 24 to permit an adequate area for cut particles to find relief as the kernels are stripped from an ear of corn. The same action assists in the coring operation as illustrated in FIG. 20 and described above. As shown in FIG. 10, the teeth are in the cross-sectional configuration of an isosceles trapezoid, each presenting its respective tooth land 66 and tooth groove 68. As illustrated in FIG. 9 being a transverse sectional view, the tooth edge 64 is tapered centrally, preferably at an angle between 20° and 60° with the horizontal as illustrated in FIG. 9.

In a successful commercial embodiment the angularity of the isosceles trapezoidal configuration of the teeth is 45°, the height of each tooth .008", and the land width .008", with the tooth top approximating .005". The teeth are spaced on 3°, 3', 20", radial spacings, and the tooth face angle actually successfully employed is 30°. A 1/32" radius 23 rounds off the edge of the slot 24, and also that portion of the flanking tooth in each segment.

Method of stripping corn

Referring now to FIG. 2 it will be seen that in cutting the corn the use of the handle 14 is optional, depending upon how the operator wishes to hold a hot ear of corn. It is preferably employed with hot corn, and also if the hands are wet, to prevent injuring the fingers. The operator places the cover 14 over the end of an ear of corn 26, and the cutting teeth 22 are engaged and the handle 12 and the associated tubular cutter 16 oscillated back and forth. With a slight inward pressure between the one hand and the other hand, coupled with the oscillation, the kernels 28 are readily severed from the ear 26 leaving a cob portion within the tubular cutter 16. The cob portion after cut approximately half the length of the ear of corn, is then removed, reversed, and the opposite end which was formerly within the hand, is then stripped of its kernels 28. By following this method, all of the kernels available for cutting by the tubular cutter 16 are stripped from the cob, and because of the end-for-end treatment, they are uniformly and evenly removed.

The segment slots 24 which separate the two segments 20 assist in a slight tearing action when cutting the kernels off the cob. In addition they assist in ejecting the kernels from the tubular member 16 to prevent them from clinging to the tube. Furthermore, as pointed out above, by providing a plurality of tooth segments 20 flexing is permitted to relieve some binding effect, and further accommodate varying size corn cobs. A better sawing action is also provided with a lesser bevel angle of the teeth. Furthermore, the segments 24 permit cutting a tomato, for example, with a minimum of thrust. In this connection it should be remembered that the tomato skin is relatively hard, and the interior portion soft. By providing the various segments, it is possible with a reduced amount of pressure to tear the skin, and not thereafter lose control by pushing the coring member too fast into the tomato. Finally, with this particular construction using the tooth segments, a superior cutting action is achieved with a product which is inexpensively molded from plastic.

One of the advantages achieved from the 1.188" interior diameter of the cutter is that with small new ears, this particular size will present the teeth 22 to a midportion of the kernel. In this manner the kernel is not cut at its very base, and with tender fresh ears, a delicious cream style corn can be prepared. On the other hand, the larger ears are not as desirable for cream style corn, and thus the major portion of the kernels of the larger ears are stripped from the cob, and the amount of waste held to a minimum.

Method of coring

Referring now to FIG. 20, it will be seen that by presenting the tooth segments 20 to a tomato 58, the tomato core 56 can be removed with the same oscillating action that is employed in stripping corn. The interior taper of the tubular cutter portion 16 is sufficient to hold the plug within the tube to remove the same. Thereafter, if desired, a knife or other utensil can be thrust through the scalloped end 80 in order to remove the plug. In FIG. 20 it is also shown that a green pepper core 62 can be readily removed from a green pepper 60, and the pepper thereafter washed out to clean it inside. Another very useful application of the coring device is to remove a lettuce core 90 from a head of lettuce 88. After removing the core, the head of lettuce 88 is then washed, and the leaves are readily stripped for use in salads, garnishing platters, and the like.

Referring to FIGS. 16, 17, and 18, another interesting use of the coring device in preparing a stuffed potato 92 will be seen. FIG. 16 illustrates sequentially the relationship between the potato 92, the culinary device 10, and a plug removing knife 94. The tubular coring element 16 is thrust into the potato as shown in FIG. 17. When it has gone in its depth until the end of the potato abuts the collar face 34, the knife 94 is then inserted through the scalloped end 80 of the handle 12, and the knife and handle 12 are rotated simultaneously. This breaks the cored portion of the potato at its base, generally adjacent the tooth segments 20. Thereafter the potato plug 96 is removed as shown in FIG. 18, the end cap 98 severed, the interior filled with cheese, meat, or any other stuffing, and the end cap 98 repositioned in place. Thereafter the potato can be baked in the form as shown in FIG. 19, with the interior already seasoned. Also desirable for this step is to bake the butter inside of the potato, and including any other seasoning desired, so that the entire flavor permeates the baked potato.

Another stuffing application is shown illustratively in FIG. 21, where a cucumber 100 is first cored, stuffed with cream cheese 102, or other suitable stuffing, and then the knife 94 employed to slice off the cucumber wheels 104. It will be appreciated that with an unusually long cucumber, the coring step may have to be repeated two or three times to utilize the entire length of the cucumber.

Scalloping

As illustrated in FIG. 22, by holding a grapefruit 106 on its edge on a cutting board 108, the tubular cutter portion 16 may be employed to cut scalloped relief portions 110 in the edge of the grapefruit. The front elevation at the right hand portion of FIG. 22 illustrates how the grapefruit half appears after it has been scalloped.

Petite sandwiches

In the making of a petite sandwich, the combined use of the tubular cutter portion 16 and its associated handle 12 is required along with the cover 14 as illustrated in FIGS. 11 through 13 inclusive. First, a sandwich filler 86 such as a prepared meat, or thin slice of American cheese is placed on the cutting board 108. Thereafter the tubular cutter 16 is oscillated as illustrated on the left portion of the cutting board, and the sandwich fillers or plugs 54 are cut as illustrated. Thereafter two slices of preferably very fresh bread 84 are filled at spaced locations with the sandwich fillers 54 as illustrated in FIG. 12. The two pieces of bread being face to face as illustrated in FIG. 13, are then placed again on top of the cutting board, and the cover 14 positioned over each of the sandwich plugs 54 as illustrated in FIG. 13. Then the cover 14 is pressed downwardly with a brisk firm motion and oscillated slightly. Through this action, the scalloped cutting edge 50 of the cover 14 actually seals or welds the two slices of bread together simultaneously while cutting them, and presenting a scalloped sealed edge 53 as illustrated in FIG. 15. The petite sandwich 52 as shown in FIG. 14, thus presents the scalloped cutting edge 53, the interior plug 54 being completely sealed inside. The sandwiches can be served in this manner, or, to improve their taste, fried in a skillet rubbed lightly with butter until brown on both sides. In the event the bread does stick to the cover 14 at its scalloped edge 50, the finger can readily be inserted in the finger hole 76 at the top end of the cover, and the petite sandwich 52 ejected. Oftentimes it will prove desirable to retain the petite sandwich right in the cover 14 to drop it directly into the skillet for browning.

In review it will be seen that a culinary device 10 has been disclosed and described which has unusual application in the stripping of kernels from an ear of corn. It not only cuts the kernels from cold corn, but the handle portion 14 can be readily employed to assist and protect the hand when hot corn is stripped. In addition, the tubular cutter portion will core peppers, potatoes, cucumbers, and tomatoes. Indeed, its unique tapered portion is such that in coring an apple it will not split the apple. Furthermore, the tubular cutter portion 16 can be used to cut petite sandwich fillers, while the cover portion 14 can be employed to seal and shape the petite sandwich. The entire product can be molded of three parts from relatively inexpensive plastic, and yet is durable and safe in use. The handle and cover are fluted to provide an attractive exterior, render the same easier to use, and keep the hand cool when employing the appliance 10 to cut hot corn, or other hot foodstuffs. The ends are open for easy ejection, sanitation, and ease of cleaning. Furthermore, the entire appliance is compact, having a total length of less than 8", and a total over-all diameter of approximately 2".

Although particular embodiments of the invention have been shown and described in full here, there is no intention to thereby limit the invention to the details of such embodiments. On the contrary, the intention is to cover all modifications, alternative embodiments, usages and equivalents of the coring, cutting and stripping appliance as fall within the spirit and scope of the invention, specification and appended claims.

What is claimed is:

1. A culinary device comprising, a hollow handle, one end of said handle tapering to define a constricted open end portion, a tubular cutter portion, said tubular cutter portion having a length diameter ratio of 1:1 to 2:1, a collar portion joining the cutter to the handle, the cutter diameter being less than the handle diameter, a plurality of tooth segments at the outer end of the cutter defining slots therebetween, the remainder of the tubular cutter portion having a cylindrical imperforate open ended body tapering convergingly both interiorly and exteriorly toward the teeth from the collar in a range between ½° and 3° and a plurality of teeth at the outer end of the tooth segments, the tubular handle being of sufficient length to be grasped by the hand and oscillated.

2. A culinary device comprising, a tubular handle, one end of said handle tapering to a constricted finger opening, a tubular cutter portion, a collar portion joining the cutter to the handle along a common axis, the cutter diameter being less than the handle diameter, a plurality of tooth segments defined by longitudinal slots at the outer end of the cutter, a plurality of teeth on the end of said segments, each tooth tapering centrally at an angle between 20° and 60°, the tubular cutter tapering from the collar portion to the teeth at an angle between ½° and 3°.

3. A culinary device comprising, a tubular handle, longitudinal flutes on said handle presenting a scalloped cross section, one end of said handle tapering to a constricted finger opening, a tubular cutter portion, a collar portion joining the cutter to the handle along a common axis, the cutter diameter being less than the handle diameter, a plurality of tooth segments defined by longitudinal slots at the outer end of the cutter each tooth tapering centrally at an angle between 20° and 60°, a plurality of teeth on the end of said segments, the tubular cutter length being greater than its diameter.

4. A culinary device comprising, a tubular handle, longitudinal flutes on said handle presenting a scalloped cross section, one end of said handle tapering to a constricted finger opening, an imperforate tubular cutter portion, a collar portion joining the cutter to the handle along a common axis, the cutter diameter being less than the handle diameter, a plurality of tooth segments defined by longitudinal slots at the outer end of the cutter, a plurality of teeth on the end of said segments, the tubular cutter tapering from the collar to the teeth at an angle between ½° and 3°, the length of the tubular cutter exceeding its diameter to thereby coact with the material being cut to align the cut.

5. A cover for use with a culinary device having a tubular cutting element, said cover having a tubular fluted body portion tapering at one end to a finger hole, the open end of said fluted tubular portion having an edge oriented in a plane perpendicular to the longitudinal axis of the tubular portion, and a tapered inner face at said edge defining a cutting edge and providing a fluted-scalloped mounting surface.

6. A cover for use with a device having a tubular cutting element, said cover having a tubular fluted body portion tapering at one end to a finger hole, a plurality of husk locks oriented radially within the tapered end adjacent the finger hole, the open end of said fluted tubular portion having a cutting edge oriented in a plane perpendicular to the longitudinal axis of the tubular portion, and a tapered inner face at said edge defining a cutting edge and providing a fluted-scalloped mounting surface.

7. A culinary device comprising, a tubular handle, longitudinal flutes on said handle presenting a scalloped cross section, one end of said handle tapering to a constricted finger opening, a tubular cutter portion, a collar portion joining the cutter to the handle along a common axis, the cutter diameter being less than the handle diameter, a plurality of tooth segments defined by longitudinal slots at the outer end of the cutter, a plurality of teeth on the end of said segments, the tubular cutter tapering from the collar to the teeth at an angle between ½° and 3°, the length of the tubular cutter exceeding its diameter to thereby coact with the material being cut to align the cut, in combination with a cover, said cover having a tubular body with flutes complementary to the handle body, the end of said cover terminating in a constricted finger opening, a plurality of runners within the cover presenting faces on a circular locus approximating the diameter of the tubular cutter portion to thereby receive the same.

8. A culinary device comprising, a tubular handle, longitudinal flutes on said handle presenting a scalloped cross section, one end of said handle tapering to a constricted finger opening, a tubular cutter portion, a collar portion joining the cutter to the handle along a common axis, the cutter diameter being less than the handle diameter, a plurality of tooth segments defined by longitudinal slots at the outer end of the cutter, a plurality of teeth on the end of said segments, the tubular cutter tapering from the collar to the teeth at an angle between ½° and 3°, the length of the tubular cutter exceeding its diameter to thereby coact with the material being cut to align the cut, in combination with a cover in which the untapered end has a tapered inner edge to serve the twofold purpose of abutting the appliance collar and defining a scalloped cutting edge.

9. A culinary device and cover therefor comprising, in combination, a hollow handle, one end of said handle tapering to define a constricted open end portion having a length exceeding its diameter, a collar portion joining the cutter to the handle, the cutter diameter being less than the handle diameter, cutting means at the outer end of the tubular cutter portion, the cover for the culinary device having a tubular body complementary with the tubular handle, the end of said cover terminating in a constricted finger opening, a plurality of husk locks within the cover adjacent the restricted finger opening positioned radially of the tubular member and extending inwardly to wedgingly engage the end of an ear of corn while the other end of the ear is being stripped.

References Cited by the Examiner
UNITED STATES PATENTS

| | | | |
|---|---|---|---|
| 359,950 | 3/1887 | Wilcox | 146—4 |
| 470,739 | 3/1892 | Belding | 52—16 |
| 2,326,873 | 8/1943 | Meek | 146—4 |
| 2,555,735 | 6/1951 | Estabrooks | 30—355 |
| 2,799,930 | 7/1957 | Champlin | 30—355 |
| 2,815,156 | 12/1957 | Moy | 222—520 |
| 2,969,896 | 1/1961 | Lerner | 222—520 |
| 2,990,615 | 7/1961 | Ohler | 30—25 |
| 3,028,992 | 4/1962 | Bucher et al. | 222—182 |
| 3,077,909 | 2/1963 | Trenor | 146—4 |
| 3,185,350 | 5/1965 | Abplanalp et al. | 222—182 |
| 3,203,577 | 7/1965 | Parker | 222—182 |

WILLIAM FELDMAN, *Primary Examiner.*

GIL WEIDENFELD, *Assistant Examiner.*